United States Patent [19]  
Widmer

[11] 3,887,132  
[45] June 3, 1975

[54] BOOM ASSEMBLY
[76] Inventor: Gerald L. Widmer, 1176 Roselawn, Paxton, Ill. 60957
[22] Filed: Aug. 12, 1974
[21] Appl. No.: 496,629

[52] U.S. Cl. .............................................. 239/166
[51] Int. Cl. ........................................... B05b 1/20
[58] Field of Search .......... 239/161, 160, 166, 163, 239/167, 168, 169

[56] References Cited  
UNITED STATES PATENTS

| | | | |
|---|---|---|---|
| 2,965,304 | 12/1960 | Krause | 239/161 |
| 3,117,725 | 1/1964 | Palmer | 239/160 |
| 3,395,503 | 8/1968 | Greenburg et al. | 239/166 |
| 3,565,341 | 2/1971 | Burroughs | 239/169 |
| 3,807,676 | 4/1974 | Bieker et al. | 239/167 |

Primary Examiner—Lloyd L. King  
Attorney, Agent, or Firm—Molinare, Allegretti, Newitt & Witcoff

[57] ABSTRACT

A spray boom assembly adapted for mounting on a vehicle, includes a pair of spray booms mounted for movement between a horizontally extended rigged-out position and an elevated rigged-in position. A single power cylinder moves the booms between the rigged-out and rigged-in positions and a lift link assembly is pivotally attached to the boom to effect elevation of the boom automatically upon rigging-in and depression of the boom automatically to its horizontally extended rigged-out position.

12 Claims, 6 Drawing Figures

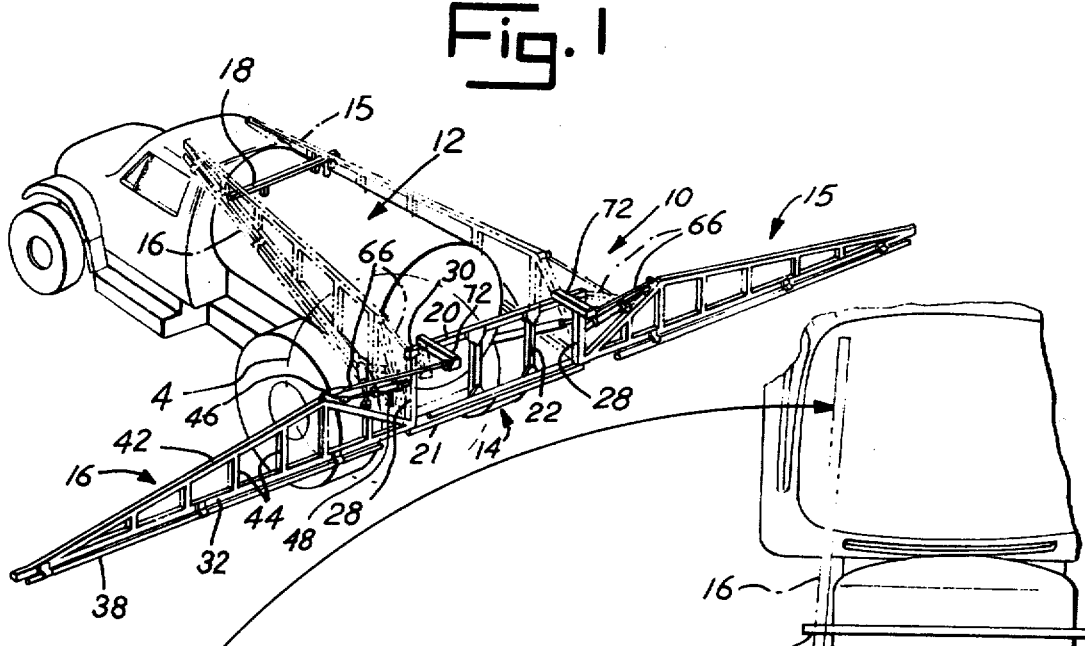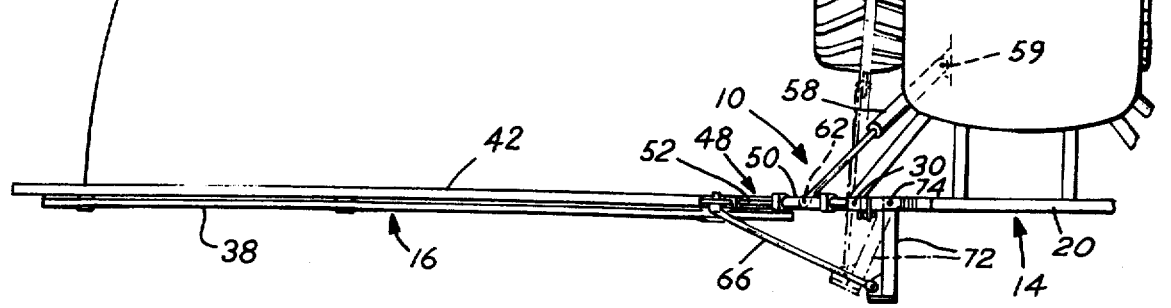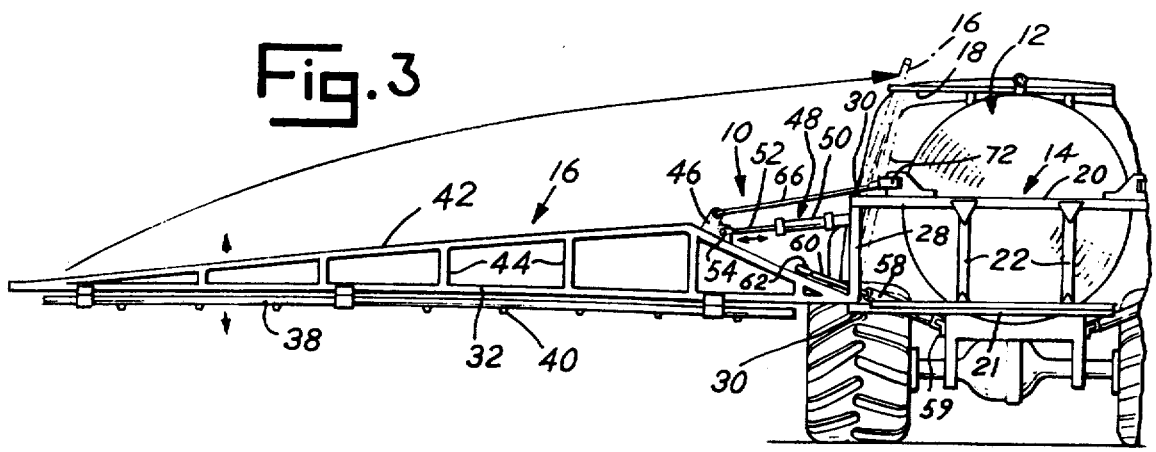

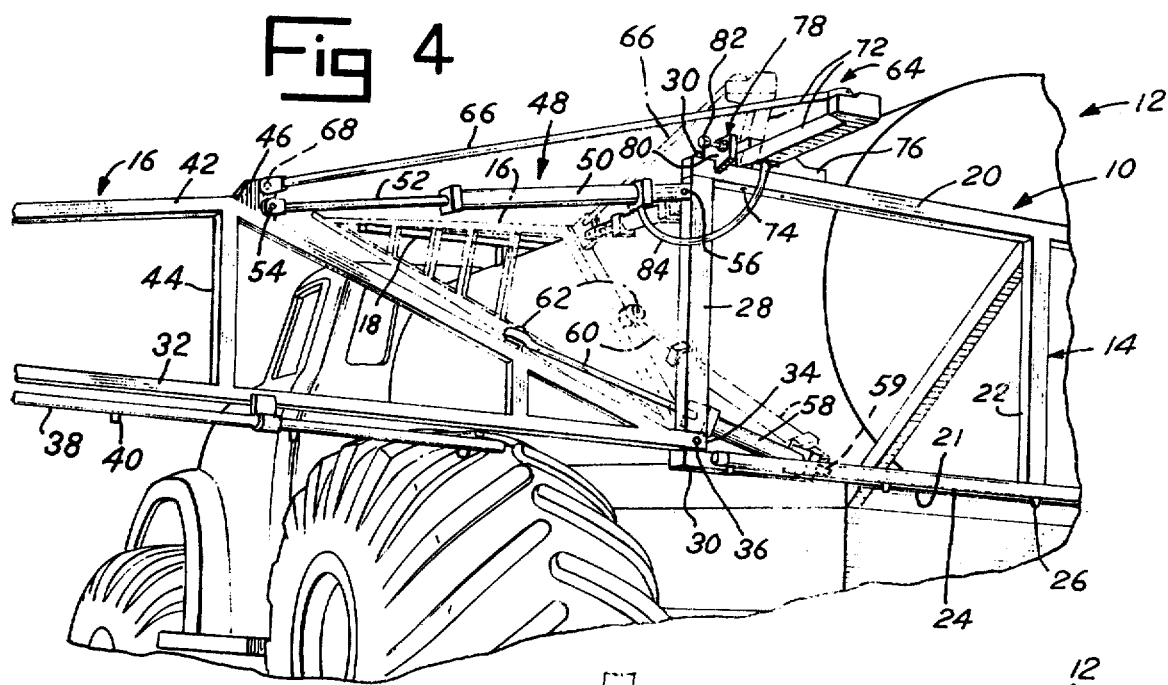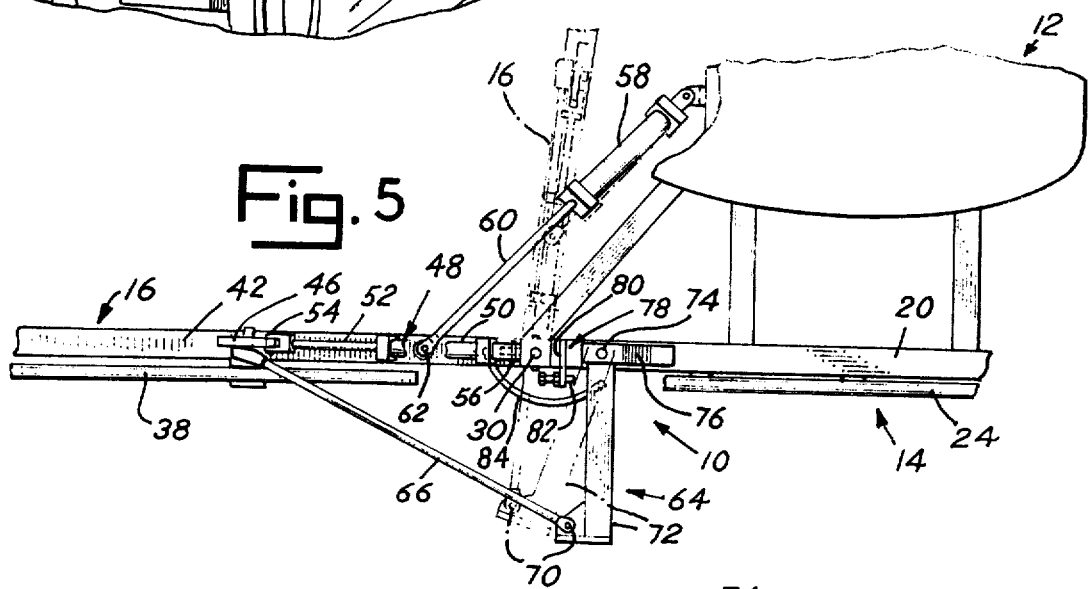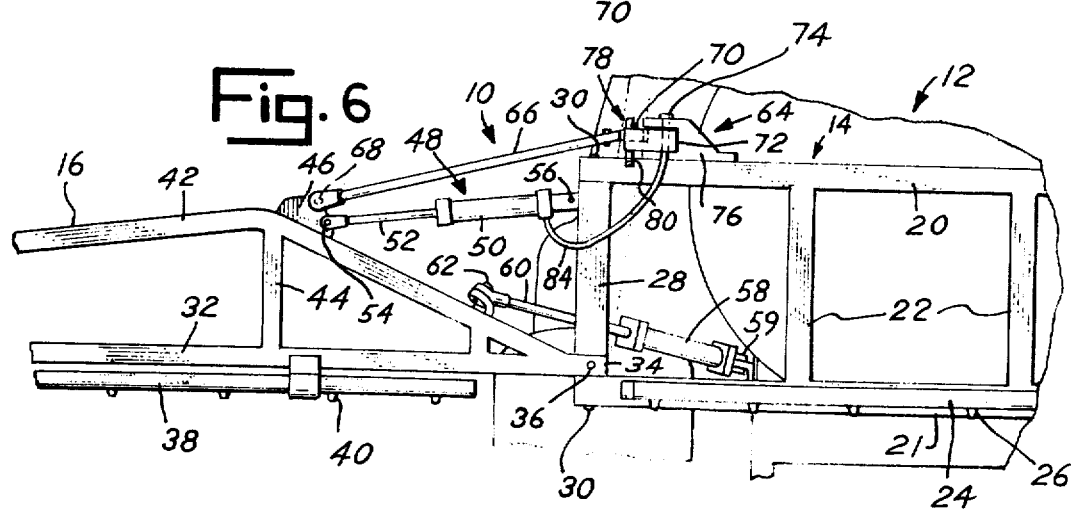

BOOM ASSEMBLY

BACKGROUND AND SUMMARY OF THE INVENTION

This invention relates to a boom assembly and, more particularly, to a spray boom assembly for mounting on a vehicle.

Several spray boom assemblies have been employed in the past for mounting and transport on tank vehicles for the spreading of liquids along a path of substantial width in the direction of movement of the vehicle. For example, such boom assemblies have been employed in road construction and have also found widespread usage in agricultural applications for the spraying of fertilizers, pesticides, herbicides and the like. When the spray booms are rigged-out, the booms extend for a distance substantially wider than the width of the vehicle. It is therefore desirable to provide a mechanism in such assemblies for rigging-in the booms alongside the vehicle for transport so that the vehicle may be garaged or transit roads or spaces narrower than the substantial width of the extended booms. In such assemblies which include a rigging-in feature, it is also desirable to elevate the respective booms upon rigging-in so that the booms clear the usually large rear tires of the vehicle and also to allow for ingress and egress from the cab of the vehicle by the operator.

Accordingly, various vehicle mounted spray booms have been employed in the past which include the capability of rigging-in and rigging-out. One such prior assembly employs a manual rig-in/rig-out construction in which the operator must physically move and elevate the booms during rigging-in and rigging-out. Such manual assemblies, although simple, are impractical where the spray booms are of considerable length and weight.

In the latter assemblies, power means have been provided by way of hydraulic cylinders and the like, for accomplishing the rig-out rig-in function under power. The rigging-out and the rigging-in operation generally involves both the swinging of the booms in a horizontal direction, as well as elevation of the booms into transport cradles on the vehicle. Several forms of mechanisms have been employed in the past to achieve this dual-directional boom movement. In one form of prior assembly, plural hydraulic cylinders have been provided for each boom, one for imparting the horizontal motion to the boom and the other for elevating the boom. Such plural hydraulic cylinder constructions are not only relatively expensive due to the need for at least four hydraulic cylinders, but also result in increased maintenance. In another prior form of assembly, flexible chains or cables have been provided which are attached between the boom and a fixed portion of the assembly, such that when the boom is moved horizontally by the power cylinder, these chains or cables become taut and act in the manner of reins which tension and draw the booms upward in elevation. In the latter assemblies the flexible chains or cables also serve the additional function of supporting the booms in their horizontal rigged-out condition. Such flexible chain or cable constructions suffer several disadvantages. In the first instance, the flexible chains or cables are subject to tangling and kinking, since at some point in the operation of the boom, some or all of the chains or cables will be in a slackened condition. Moreover, some problem is presented in the storage of such slack chains or cables so that they do not drag or become entangled with other structure on the boom assembly or the vehicle itself. In addition, such chains or cables when operating in their boom support function, may be exposed to substantial stresses and possible breakage due to bouncing or jogging of the substantially long and heavy booms as the vehicle is placed in operation on rough terrain and these flexible chains or cables provide little if any damping action against such bouncing. This danger is even more apparent when the sprayer manifolds on the booms are filled with liquid during operation.

A spray boom assembly employing the principles of the present invention obviates these several disadvantages. In a spray boom assembly incorporating the principles of the present invention, only a single power cylinder is employed to rig-out and rig-in each of the spray booms. Thus, duplication of mechanical elements is avoided and expense and maintenance are reduced. In a spray boom assembly incorporating the principles of the present invention, the spray boom is automatically elevated upon rig-in and is automatically depressed to its working elevation during rig-out, and such automatic elevation and depression are effected without the use of chains or cables and the problems attendant thereto or without the duplication of working cylinders. In a spray boom assembly incorporating the principles of the present invention, a rigid lift link assembly is pivotally mounted to the spray boom to effect automatic elevation and depression during rig-in and rig-out. Such lift link assembly is not subject to kinking or twisting and does not result in the presence of slack material which may become tangled or kinked or which must be stored. A spray boom assembly incorporating the principles of the present invention is simple in construction and, thus, is relatively maintenance free. In a spray boom assembly incorporating the principles of the present invention, a lift link assembly is provided which may be readily adjusted, depending upon the degree of elevation or depression desired for the particular vehicle and, thus, uniform parts may be stocked as standard items, but which are capable of use with widely varying vehicle configurations. In a spray boom assembly incorporating the principles of the present invention, an improved shock mounting assembly may be provided to support the boom in its rigged-out condition and such assembly is not subject to the disadvantages of cables or chains and damps the movement of the booms during operation. Finally, in a spray boom assembly incorporating the principles of the present invention, a lift link assembly may be provided for automatically controlling the elevation or depression of the spray boom during rig-in and rig-out, an improved fluid shock mounting assembly may be provided for supporting the spray boom in its rigged-out condition, and the link assembly may be utilized as a fluid reservoir for such shock mounting and supporting assembly.

In a principal aspect of the present invention, a spray boom includes frame means which is adapted to be mounted upon a vehicle, at least one spray boom and mounting means mounting the spray boom to the frame means for movement both horizontally and in elevation between rigged-out and rigged-in positions. In this combination, the improvement includes urging means for urging the boom between the rigged-out and rigged-in positions and movable lift link means for guiding the movement of the boom between the rigged-out and rigged-in positions and elevating the boom as the boom moves toward the rigged-in position. The lift link means includes first and second rigid members, pivot means mounting these members to the boom and frame means and to each other and stop means which prevents the pivotal movement of one of the rigid members to effect elevation of the spray boom when the boom is moved by the urging means.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a perspective view of a preferred embodiment of spray boom assembly of the present invention which is mounted on a tank truck and in which the spray booms are shown in both the rigged-out and rigged-in conditions;

FIG. 2 is a partially broken plan view of the boom assembly and vehicle shown in FIG. 1;

FIG. 3 is a partially broken rear elevation view of the boom assembly and vehicle shown in FIG. 1;

FIG. 4 is an enlarged partially broken rear perspective view of one of the spray booms and the operating mechanism therefor as shown substantially in circle 4 in FIG. 1;

FIG. 5 is an enlarged partially broken plan view of the boom operating mechanism shown in FIG. 4; and FIG. 6 is an enlarged partially broken rear elevation view of the boom operating mechanism shown in FIG. 4.

DESCRIPTION OF THE PREFERRED EMBODIMENT

Referring particularly to FIGS. 1-3, a preferred embodiment of spray boom assembly 10 constructed in accordance with the principles of the present invention is shown mounted on a tank truck or vehicle 12. The spray boom assembly 10, in general, comprises three sections, a first frame section 14 of which is rigidly and stationarily mounted by way of suitable mounting supports (not shown) to the rear of the tank vehicle 12. The other two sections comprise a pair of elongate spray booms 15 and 16 rotatably mounted at the opposed ends of the frame section 14 for movement between a rigged-out position as shown in solid in FIGS. 1-3 in which the bottoms of the spray booms 15 and 16 extend substantially horizontal to the ground, and a rigged-in position as shown in dot and dash in FIGS. 1-3 in which the ends of the respective spray booms are swung forward toward the front of the vehicle 12 and elevated upward to rest in vehicle mounted support cradles 18 for transport. Since both of the spray booms 15 and 16 are substantially identical in construction, only boom 16 will be described in detail hereinafter.

Referring now particularly to FIGS. 4-6 in which the operating mechanisms of the spray boom assembly are shown in enlarged form, the frame section 14 which is fixed stationarily to the rear of the vehicle, comprises a plurality of horizontal beam members 20 and 21 which are spaced apart from each other at transverse intervals by rigid vertical beams 22. A spray manifold 24, having a plurality of spray nozzles 26, is mounted to beam 21 as shown in FIGS. 4-6 and is connected to receive liquid from vehicle 12. A vertical rotatable post 28 is provided at each end of the frame section and this post 28 is mounted thereat for rotation on beams 20 and 21 about a vertical axis by upper and lower pivot pins 30.

The spray boom 16 includes a horizontal bottom beam 32 which extends outward from the frame section 14 and is attached at one end to the post 28 by a U-shaped flange 34 and pivot pin 36 as shown in FIGS. 4 and 6. Thereby, the bottom beam 32 is capable of pivotal movement relative to post 28 about the horizontal axis defined by pivot pin 36, such that the outer end of the spray boom is movable up and down in elevation to allow the boom to move up and down during operation over rough terrain and to allow the boom 16 to be elevated during rig-in as shown in FIGS. 1 and 3 in dot and dash.

An elongate manifold 38, having a plurality of spray nozzles 40, is mounted to the horizontal beam 32 of the boom and liquid from the vehicle tank is communicated to the manifold by suitable hose couplings (not shown).

To provide structural strength to the boom 16, the boom also preferably includes an upper inclined beam 42 which is rigidly attached to the lower boom beam 32 by way of upright stringers or supports 44. The length of the upper beam 42 is somewhat shortened such that it reaches its maximum elevation adjacent to, but spaced from posts 28. Adjacent this upper elevation, a flanged bracket 46 is firmly fixed to the boom, as by welding or the like, and a shock cylinder assembly, generally 48, is attached between post 28 and bracket 46.

The shock cylinder assembly 48 includes a conventional fluidorifice cylinder 50, preferably hydraulic, having a piston therein and a piston rod 52 extending from one end thereof. The piston rod 52 is pivotally attached to bracket 46 by way of a pivot pin 54 and the housing of the shock cylinder 50 is pivotally attached to post 28 by way of pivot pin 56.

A second fluid cylinder 58, also preferably hydraulic, is provided. However, unlike shock cylinder 50, cylinder 58 is a power cylinder which is supplied with a source of pressurized hydraulic fluid from, by way of example, a power takeoff hydraulic pump (not shown) on the vehicle itself. This cylinder 58 is firmly, but pivotally, attached at 59 to a rigid stationary structure, for example the chassis of the vehicle 12, and its piston rod 60 is attached, by way of pivot pins 62, to the spray boom 16. Thus, cylinder 58 constitutes a power cylinder which urges the spray boom horizontally about pivot pins 30 between the rigged-out and rigged-in positions.

Referring again particularly to FIGS. 4-6, a movable lift link assembly, generally 64, is provided for effecting automatic elevation of the boom 16, as the boom is being moved horizontally about pins 30 by cylinder 58 toward the rigged-in position, and automatic depression as the boom is being moved by cylinder 58 to the rigged-out position.

The lift link assembly 64 comprises an elongate rigid shaft or rod member 66 which is pivotally attached to bracket 46 at one end by pivot pin 68 and is pivotally attached at its other end by pin 70 to the end of a rigid arm 72. The arm 72, in turn, is pivotally attached adjacent its other end to the upper beam 20 of the frame section 14 by a pivot pin 74 which extends through arm 72 and a bracket 76 mounted stationarily to beam 20, as shown in FIGS. 4-6. A stop, generally 78 as shown in FIGS. 4-6, is firmly mounted adjacent to, but spaced from, the pivotal attachment 74 of arm 72, to the beam 20 as by welding or the like. The stop 78 comprises a flange member 80 and an adjustment bolt 82 which is threaded through the flange 80. As shown particularly in FIG. 5, the adjustment bolt 82 may be selectively threaded through the flange 80 such that a predetermined length of the bolt extends beyond the flange to act as a limit stop limiting the amount of pivotal movement of the arm 72 about its pivot pin 74 which, in turn, controls the total degree of elevation of the boom.

It will be recalled that the shock cylinder 50 is preferably of the fluid and orifice type. Such cylinders frequently employ a hydraulic fluid reservoir from which fluid is transferred to and from the cylinder through an orifice depending upon the forces imparted to the piston rod 52. In the present assembly, the rigid arm 72 preferably comprises a liquid-tight hollow tube or housing which acts as such reservoir, the arm 72 and cylinder 50 communicating with each other by way of a suitable conduit, such as hose 84.

Although it is believed from the foregoing description, that the operation of the boom assembly of the present invention will be clear to one skilled in the art, a description of the operation follows.

Initially it will be assumed that the spray boom assembly is in its fully rigged-out condition for operation in the field. In his condition, the spray boom will extend transversely of the tank vehicle 12 in generally coplanar relationship to the frame section 14 as shown in the drawings in solid and will be supported by way of the shock cylinder 50 and piston rod 52 such that the lower beam 32 of each of the spray booms will extend substantially horizontally and parallel to the ground. In this condition, the rigid elongate rod 66 and arm 72 of the lift link assembly 64 will be positioned as shown in solid in FIGS. 2 and 5.

As the vehicle is placed into operation, liquid is drawn by a suitable pump or the like and transmitted to the manifolds 24 and 38 and the vehicle is driven forward through the area which is to be sprayed. Since such vehicles are generally intended to traverse substantially rough terrain, some whipping or bouncing of the substantially long booms 15 and 16 is to be expected. However, in the construction of the present invention the harmful effects which might result from such whipping and bouncing are minimized and dampened. Dampening results due to the shock cylinder 50 which not only supports the booms, but also enables the ends of the booms to move up and down, but dampens these movements by transfer of the fluid between the cylinder 50 and the fluid reservoir defined by the rigid arm 72. Moreover, any differences in elevation experienced by the boom during operation in the field are readily allowed by the pivot pins 54 and 56 of the shock absorber 50 and pivot link 34. Further, no damage will occur to the lift link assembly nor will this assembly be slackened during operation, since any vertical movement of the end of the boom during operation will simply cause the arm 72 and elongate rod 66 to pivot and work about their pivot pins 68, 70 and 74.

It will now be assumed that it is desired to cease operation of the spray boom assembly and rig-in the booms for transport.

To rig the booms 15 and 16 in, hydraulic fluid, under pressure, is admitted to cylinder 58 to retract piston rod 60 into the cylinder. As the piston rod is retracted, a pulling force will be exerted on the booms 15 and 16 tending to swing the booms horizontally in toward the vehicle 12 from the solid position shown in FIG. 2 toward the dot and dash position. As the booms swing horizontally toward the vehicle, the rigid arm 72 will be drawn by the rod 66 to rotate in a clockwise direction from the solid position shown in FIG. 5 to the dot and dash position. In the latter position, the arm 72 will contact stop pin 82 and, at that time, the arm will cease rotation about its pivot pin 74. As the boom continues its horizontal movement toward the rigged-in position, a force will now be exerted through the blocked arm 72 and rod 66 on bracket 46 of the boom causing the boom to elevate, until, when the boom is positioned as shown in dot and dash in FIG. 2, the boom will have automatically been elevated such that it fits directly into the transport cradle 18 on the vehicle 12.

The degree of elevation of the booms 15 and 16 may be readily adjusted by threading the stop bolt 82 in or out. If the stop bolt 82 is threaded all the way in, contact will occur between the bolt 82 and the arm 72 at an earlier time, thereby increasing the total degree of elevation of the boom. Conversely, if the stop bolt 82 is threaded further out, contact between the arm 72 and the bolt will occur later, thereby decreasing the total degree of elevation.

It will be understood that movement of the spray boom assembly of the present invention from the rigged-in to the rigged-out positions is exactly the opposite of the operation last described. To rig the boom out, fluid under pressure is applied to the opposite side of the piston in cylinder 58 to cause extension of the piston rod 60 from the cylinder. As the piston rod extends, the boom will exit the cradle 18 and will move outward and downward under the influence of the lift link assembly 64.

It will be understood that the embodiment of the present invention which has been described is merely illustrative of an application of the principles of the invention. Numerous modifications may be made by those skilled in the art without departing from the true spirit and scope of the invention.

What is claimed is:

1. A spray boom assembly including frame means adapted to be mounted for transport on a vehicle, at least one spray boom, and mounting means mounting said spray boom to said frame means for movement both horizontally and in elevation between rigged-out and rigged-in positions, wherein the improvement in said assembly comprises:

urging means for urging said boom between said rigged-out and rigged-in positions, movable lift link means for guiding said boom between said rigged-out and rigged-in positions and elevating said boom as said boom moves toward said rigged-in position, said lift link means comprising first and second rigid members, pivot means mounting one of said rigid members to said boom and to said other rigid member and mounting the other of said rigid members to said frame means, and stop means to prevent the pivotal movement of at least one of said rigid members to effect elevation of said spray boom when said spray boom is moved by said urging means.

2. The spray boom assembly of claim 1 wherein said urging means comprise a fluid power cylinder having a piston therein, at least one of said cylinder and piston being pivotally attached to said boom and the other adapted to be pivotally attached to a stationary structure.

3. The spray boom assembly of claim 1 wherein one of said rigid members comprises a rigid elongate member and the other of said rigid members comprises a rigid arm.

4. The spray boom assembly of claim 3, wherein said pivot means pivotally mounts said rigid elongated member to said boom and said rigid arm and pivotally mounts said rigid arm to said frame means, said rigid elongate member and said arm extending at a substantial angle relative to each other.

5. The spray boom assembly of claim 3 wherein said stop means engages said rigid arm to prevent pivotal movement thereof.

6. The spray boom assembly of claim 1 wherein said stop means includes adjustment means for adjusting the degree of elevation of said boom.

7. The spray boom assembly of claim 1 including fluid shock absorbing means attached between said boom and said frame means for supporting said boom in said rigged-out position.

8. The spray boom assembly of claim 7 wherein said shock absorbing means comprises a fluid shock absorber and a fluid reservoir, one of said rigid members comprising said fluid reservoir.

9. The spray boom assembly of claim 1 wherein one of said rigid members comprises a rigid elongate member and the other of said rigid members comprises a rigid arm, said pivot means pivotally mounting said rigid elongated member to said boom and said rigid arm and pivotally mounting said rigid arm to said frame means, said rigid elongate member and said arm extending at a substantial angle relative to each other, said stop means being positioned to engage said rigid arm to prevent pivotal movement thereof, and shock absorbing means attached between said boom and said frame means for supporting said boom in said rigged-out position.

10. The spray boom assembly of claim 9 wherein said shock absorbing means comprises a fluid shock absorber and a fluid reservoir, said rigid arm comprising said fluid reservoir.

11. The spray boom assembly of claim 9 wherein said urging means comprises a fluid power cylinder having a piston therein, at least one of said cylinder and piston being pivotally attached to said boom and the other adapted to be pivotally attached to a stationary structure.

12. The spray boom assembly of claim 9 wherein said stop means includes adjustment means for adjusting the degree of elevation of said boom.

* * * * *